(12) United States Patent
Klieman et al.

(10) Patent No.: US 9,769,151 B2
(45) Date of Patent: Sep. 19, 2017

(54) MULTI-ALGORITHM KEY GENERATION AND CERTIFICATE INSTALL

(71) Applicant: Symantec Corporation, Mountain View, CA (US)

(72) Inventors: Michael Klieman, Belmont, CA (US); Perry Tancredi, Mountain View, CA (US)

(73) Assignee: Symantec Corporation, Mountain View, CA (US)

( * ) Notice: Subject to any disclaimer, the term of this patent is extended or adjusted under 35 U.S.C. 154(b) by 385 days.

(21) Appl. No.: 14/138,436

(22) Filed: Dec. 23, 2013

(65) Prior Publication Data

US 2015/0180860 A1    Jun. 25, 2015

(51) Int. Cl.
*H04L 29/06*    (2006.01)
*H04L 9/32*    (2006.01)
*H04L 9/00*    (2006.01)
*H04L 9/14*    (2006.01)

(52) U.S. Cl.
CPC .......... *H04L 63/0823* (2013.01); *H04L 9/006* (2013.01); *H04L 9/14* (2013.01); *H04L 9/3268* (2013.01); *H04L 63/062* (2013.01)

(58) Field of Classification Search
CPC .......................... H04L 63/0823; H04L 9/0861
See application file for complete search history.

(56) References Cited

U.S. PATENT DOCUMENTS

| | | | |
|---|---|---|---|
| 2005/0071630 A1* | 3/2005 | Thornton | H04L 63/0823 713/156 |
| 2005/0235342 A1* | 10/2005 | Ene-Pietrosanu | H04L 9/088 726/6 |
| 2008/0086633 A1* | 4/2008 | Anderson | H04L 9/321 713/156 |
| 2008/0130895 A1* | 6/2008 | Jueneman | H04L 9/3066 380/277 |
| 2011/0145567 A1* | 6/2011 | Liu | H04L 63/0823 713/156 |
| 2011/0208962 A1* | 8/2011 | Andrews | H04L 9/3268 713/156 |
| 2012/0030469 A1* | 2/2012 | Hsueh | H04L 63/0823 713/175 |
| 2013/0318353 A1* | 11/2013 | Skarda | H04L 9/3263 713/175 |

* cited by examiner

*Primary Examiner* — Jeffrey Pwu
*Assistant Examiner* — William Corum, Jr.
(74) *Attorney, Agent, or Firm* — Patterson + Sheridan, LLP

(57) ABSTRACT

Techniques are disclosed for generating multiple key pairs using different algorithms and similarly installing certificates signed using the different algorithms. A customer server receives a selection of algorithms for generating a public/private key pair (e.g., RSA, ECC, DSA, etc.). The customer server generates key pairs for each selection and also generates corresponding certificate signing requests (CSR). The customer server sends the CSRs to a certificate authority (CA). The CA generates certificates associated with algorithm and sends the certificates to the customer server. The customer server may prompt a user to select one or more of the certificates to install, and upon receiving the selection, the customer installs the certificates.

12 Claims, 6 Drawing Sheets

205

| ORGANIZATIONAL NAME : | |
| COUNTRY : | |
| STATE / PROVINCE : | |
| CITY : | |
| WEBSITE : | |

SIGNING ALGORITHM
☐ RSA    ☐ ECC
☐ DSA    ☐ SELECT ALL

210

HASHING ALGORITHM
☐ SHA1    ☐ SELECT ALL
☐ SHA256

212

BACK    CONTINUE
215      220

INTERFACE

FIG. 2

MULTI-ALGORITHM KEY GENERATION AND CERTIFICATE INSTALL

BACKGROUND

Field

Embodiments of the invention generally relate to techniques for installing digital certificates on a server. More specifically, techniques are disclosed for simultaneously creating multiple key pairs and certificates using different signing and hashing algorithms.

Description of the Related Art

Both commercial and non-commercial enterprises frequently need to engage in secure online communications. To do so, PKI—public key infrastructure—has evolved to provide a variety of security mechanisms using both symmetric and asymmetric cryptography. For example, one organization may supply a digital certificate to a relying party. In a PKI scheme, a digital certificate is an electronic document that binds a public key to an identity (e.g., to an individual or to a server domain name). The binding allows a relying party to verify that the entity (or individual) named in the certificate holds the corresponding private key.

A certificate authority (CA) may use a variety of signing algorithms to sign a certificate. Although most web servers support certificates signed using the RSA signing algorithm, servers are also beginning to support other signing algorithms, such as DSA (digital signature algorithm) and ECDSA (elliptical curve digital signature algorithm). These algorithms have advantages and disadvantages relative to one another (e.g., in terms of key sizes, encryption strength, scalability, etc.), so one algorithm may be a better choice than the other, depending on the needs of users of a server. Many servers today support multiple certificates based on different algorithms. For example, a server may support connections using either RSA-based certificate or an ECC-based certificate. A customer may further configure a priority order for clients to communicate with the server (e.g., in the negotiation phase) under such algorithms. Doing so provides more flexibility to the server and better performance for the clients.

However, although servers may support multiple algorithm type-certificates at a time, the process to generate the underlying key pairs is still limited to generating one key pair using a single algorithm at a time. For example, if a customer wishes to install an RSA-based certificate and an ECC-based certificate on a server that supports both RSA and ECC algorithms, the customer has to generate key pairs corresponding to each algorithm and install each certificate separately. In addition, the customer has to engage in separate enrollment and identity authentication workflows for each separate certificate request. Further, because certificates generally have a long validity period, customers typically have infrequent experience installing certificates. Given that the installation process can be complex, a customer may possibly install certificates inaccurately. Therefore, the current approach is lengthy, tedious, and error-prone.

SUMMARY

Embodiments presented herein include a method for concurrently requesting multiple certificates from a certificate authority. The method generally includes receiving a selection of a plurality of algorithms to use in generating a corresponding plurality of key pairs and common information. The method also generally includes generating a public/private key pair for each selected algorithm. For each public key corresponding to the public/private key pairs, a certificate signing request that includes the common information is generated.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIG. 2 illustrates an example interface used to select multiple algorithms in generating certificate signing requests, according to one embodiment.

DETAILED DESCRIPTION

Figure 1:
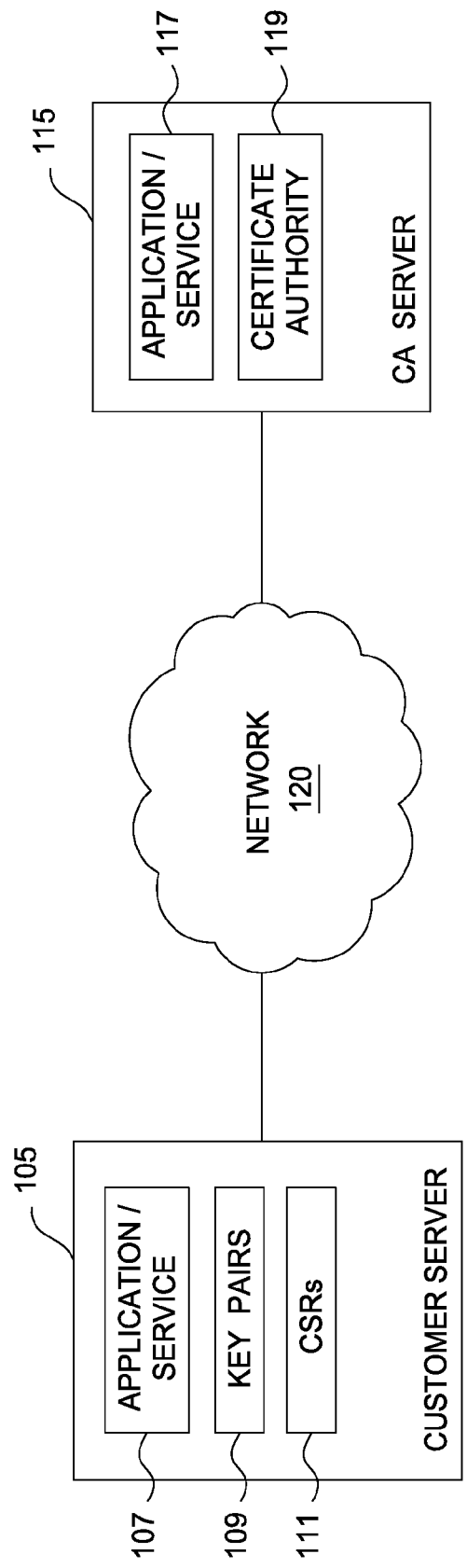
FIG. 1 illustrates an example computing environment, according to one embodiment.

Embodiments presented herein provide techniques for concurrently generating multiple key pairs using different signature and thumbprint algorithms (e.g., DSA, RSA, ECC, SHA, and the like) in response to a single customer request. Embodiments presented herein also provide techniques for installing multiple certificates signed using different algorithms. That is, the techniques disclosed herein allow a customer to install multiple certificates (signed using different signing algorithms or signing) on a server without requiring the customer to repeat either the request or the installation process for each algorithm. In one embodiment, a customer selects multiple algorithms to apply to a certificate. The server generates key pairs using the algorithms selected. For each public key, the customer server generates and sends a certificate signing request (CSR) to a certificate authority (CA). In turn, the CA generates a digital certificate for each CSR and sends the certificates to the customer server. The customer server installs each certificate using installation processes based on the selected algorithm (including downloading and installing any intermediate certificates needed for each algorithm).

In one embodiment, a front-end application may be used to generate key pairs and install certificates on the customer server. For example, the application may provide a graphical user interface that includes check boxes for each applicable signature or thumbprint algorithm. The customer may choose between a "check all that apply" mode and a "select all" mode in generating CSRs. After submitting a selection, the application generates key pairs and CSRs. Further, another interface allows the customer to install certificates signed using different algorithms. Once the digital certificates are received from the CA, the application may prompt the user to select which certificates to install (e.g., by specifying the location of the certificates on the file system). In another embodiment, a pre-defined script defining server configurations may be used in place of the front-end application.

Generating multiple key pairs allows a customer to more efficiently install multiple certificates. That is, this approach reduces the time required to install multiple certificates. Rather than generating key pairs one-by-one for each algorithm, a customer may do so at the same time. Similarly, the customer may also install each corresponding certificate at the same time. Further, because installing multiple certificates on a server that supports various algorithms is a complex task, computing multiple key pairs using each customer-selected algorithm as part of generating CSR requests and automatically installing the resulting certificates process reduces the complexity and possibility of installation errors.

In the following, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources. A user can access any of the resources that reside in the cloud at any time, and from anywhere across the Internet. In context of the present invention, a cloud based application may be configured to allow users to remotely configure and install certificates using multiple signature and thumbprint algorithms on a customer server.

FIG. 1 illustrates an example computing environment 100, according to one embodiment. The computing environment 100 allows a customer to generate public/private key pairs and install certificates concurrently using multiple signature and hashing algorithms. Examples of signature algorithms include RSA, ECDH, ECDSA, and Diffie-Hellman. Examples of hashing algorithms include SHA1, SHA224, SHA256, SHA384, and SHA512. As shown, computing environment 100 includes a customer server 105 that may be configured to support multiple signature and hashing algorithms. Customer server 105 may be a physical computing system (e.g., a system in a data center) or may be a virtual computing instance executing within a computing cloud. As shown, customer server 105 hosts an application/ service 107 used to request, configure, and install digital certificates on customer server 105. Application/service 107 may be a desktop application, web service, or a browser client.

In addition, application/service 107 allows users to select algorithms to generate public/private key pairs submitted with a CSR to a certificate authority (CA) server 115. For example, application/service 107 may provide users with a graphical user interface that prompts users to select algorithms to use for the key pairs. Once a user selects one or more algorithms, application/service 107 generates a key pair 109 for each selected algorithm. Application/service 107 generates certificate signing requests (CSRs) 111 each of which includes one of the public keys of the generated key pairs 109. In addition, the CSRs include other information that may be required by CA server 125 (e.g., organization name, physical address, domain name, e-mail address, etc.) to apply for a digital certificate. The application/service 107 then sends CSRs 111 to CA server 125 via a network 120 (i.e., the Internet).

As shown, CA server 115 includes an application/service 117 and a certificate authority 119. Application/service 117 communicates with customer server 105 over network 120 to generate multiple certificates. For instance, application/service 117 may receive CSRs 111 from customer server 105. Certificate authority 119 generates and issues certificates to customer server 105 based on CSRs 111.

Once the customer server 105 receives the certificates from CA server 115, application/service 107 may prompt the customer (e.g., through a user interface on the application) to select which certificates to install on the server 105. After the customer provides a selection, application/server 107 installs the selected certificates on the server. Automatically performing the installation processes for each algorithm reduces the amount of customer interaction and human error generally resulting in separately installing each certificate.

FIG. 2 illustrates an example user interface 200 of an application configured to allow a customer to select multiple algorithms used to generate public/private key pairs and CSRs, according to one embodiment. Typically, the application resides on a customer server that hosts applications which support multiple algorithm type-certificates (e.g., RSA certificates, DSA certificates, and the like). However, note that the application may also be executed by non-customers (e.g., administrators, consultants for the certificate authority, etc.). As stated, a customer may select which algorithms should be used to generate public/private key pairs. Note, while FIG. 2 illustrates an example graphical user interface, a command line tool or other input mechanism (e.g., a policy configuration file) may be used as well.

As shown, interface 200 includes fields 205, a signing algorithm list 210, a hashing algorithm list 212, a back button 215, and a continue button 220. The customer inputs information in fields 205 required by a CA to generate a certificate, such as an organizational name, country, state/province, city, and website address. Such information may be common to each certificate request. Further, the customer may check boxes on algorithm list 210 to identify algorithms to use in generating public/private key pairs. As an example, signing algorithm list 210 displays three signature algorithms: RSA, DSA, and ECC. As another example, hashing algorithm list 212 displays two hashing algorithms: SHA1 and SHA256. Of course, interface 200 and the customer server may support fewer or more algorithms. Further, the algorithm lists may also allow a user to specify a key size associated with an algorithm (e.g., RSA 1024-bit or RSA 2048-bit, etc.). Generally, the interface 200 allows certificate configuration options (currently existing and later-specified options) to be specified.

Once a user clicks the continue button 220, the application generates public/private key pairs based on each algorithm selected by the customer in list 210. For example, if the customer marks the checkboxes next to RSA and ECC and clicks continue button 220, the application on the customer server, generates two key pairs: one using the RSA algorithm and another using the ECC algorithm. Once generated, the application also generates a CSR request for each generated key pair. Each CSR requests includes the common information (e.g., the organization name, etc.) and one of the key pairs. That is, each CSR includes the information provided by the customer in fields 205 and also includes a public key associated with one of the generated key pairs (i.e., the application generates a CSR for each key pair). The application sends the CSRs to a CA, which initiates an authentication process before generating certificates associated with the CSRs.

The application may provide a similar interface to install multiple certificates. For example, after authenticating the CSRs and customer credentials, the CA sends certificates to the customer server. Once received, the application may prompt the customer to choose one or more of the certificates to install. For example, the application may prompt the customer to specify a location where to store a given certificate or specify an install or import script used by a given application (e.g., a web server) to install and configure a certificate. Once the customer selects which certificates to install, the application installs each selected certificate. However, rather than requiring the customer to install each certificate one at a time, the application repeats the installation process for each certificate until all are installed on the customer server.

In one embodiment, an application hosted by the CA may allow a customer to confirm whether the customer server properly installed a certificate. For example, the application may be implemented as a web service which allows the customer to enter a domain name corresponding to the certificate. The server application then retrieves and evaluates the certificate installed on the customer server to determine whether the certificate was properly installed. The application notifies the customer of the result.

Figure 3:
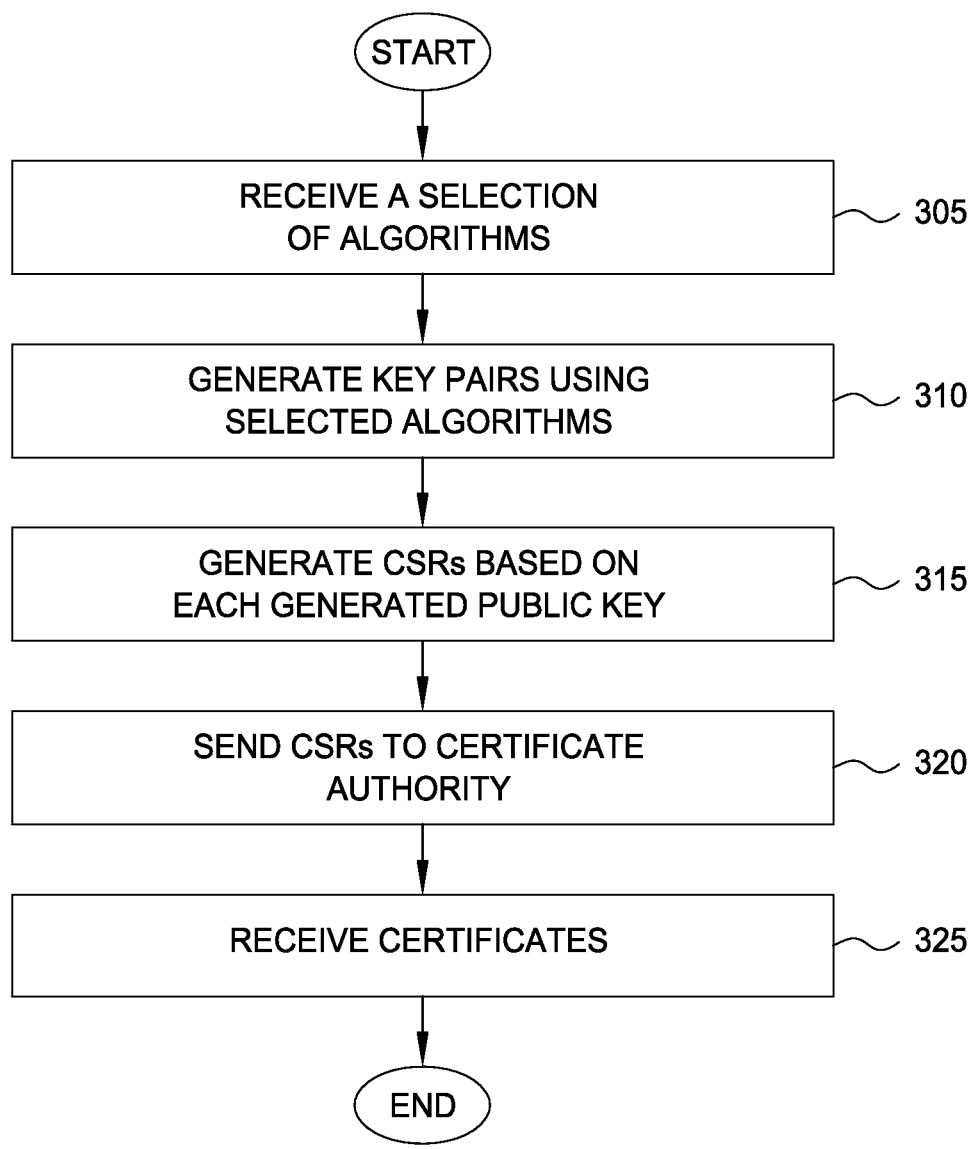
FIG. 3 illustrates a method for generating multiple key pairs using different algorithms and sending corresponding public keys to a certificate authority, according to one embodiment.

FIG. 3 illustrates a method 300 for requesting certificates from a CA, according to one embodiment. As shown, method 300 begins at step 305, where a user selects multiple key generation algorithms to use to generate key pairs. The user may provide the selection via the application interface described above. For example, the selection may include the RSA and DSA algorithms. At step 310, the application generates a key pair using each selected algorithm. Continuing with the previous example results in an RSA key pair and a DSA key pair.

At step 315, the customer server generates a CSR which includes one of the public key from each key pair and other information needed to generate a certificate naming one of the keys. At step 320, the customer server sends the generated CSRs to the CA. In turn, the CA begins the authentication process, and, once the CA authenticates the requesting party, the CA generates a certificate for each CSR, digitally signed with the private key of the CA. The CA sends the generated certificates to the customer server for installation. At step 325, the customer server receives and stores the certificates. The customer may later install the certificates.

Figure 4:
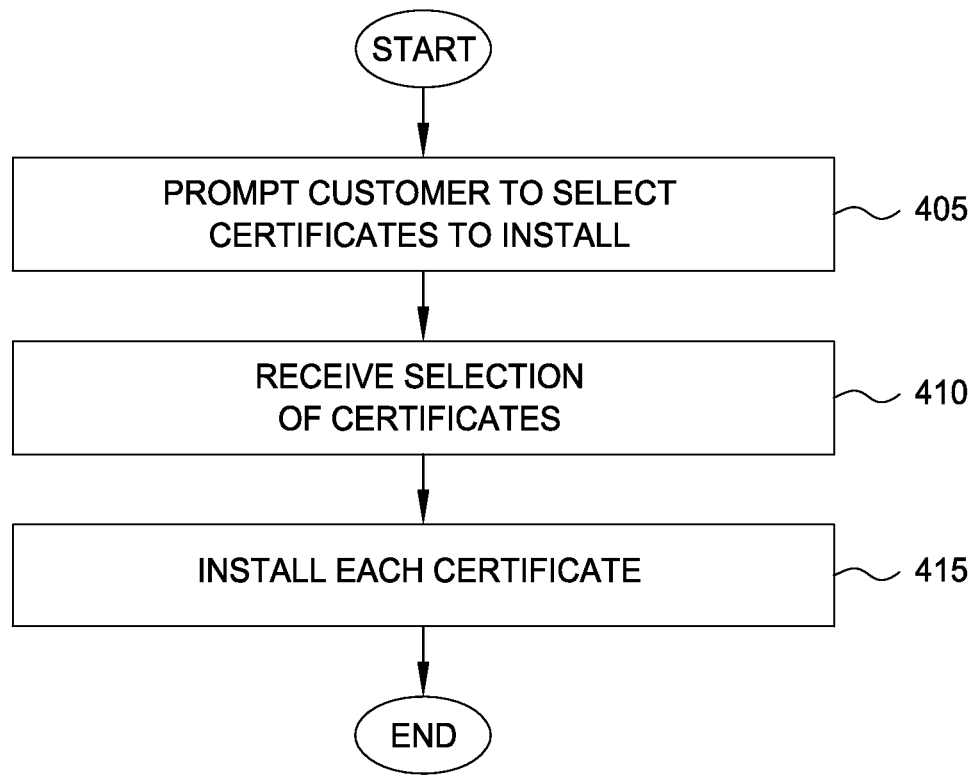
FIG. 4 illustrates a method for installing certificates signed using different algorithms, according to one embodiment.

FIG. 4 illustrates a method 400 for installing certificates signed using different algorithms, according to one embodiment. As stated, the customer server stores the certificate files received from the CA. Method 400 begins at step 405, where the application prompts the customer to select which certificates to install. At step 410, the customer server receives the selection.

At step 415, the customer server installs the certificates. Because the certificates are generated using different algorithms, the server may perform different steps to install each certificate. For example, some processes may include downloading different sets of intermediate certificates (i.e., certificates linking to a root certificate of a certificate authority) for each algorithm used. In one embodiment, the customer may access an application hosted on the CA server to determine whether the customer server properly installed each certificate. To do so, the customer accesses the application and enters the domain name associated with a given certificate. The application retrieves the certificate from the server and evaluates the certificate to ensure that the certificate has been properly installed. Alternatively, the customer may also provide server access to the to a service provider to determine whether the customer server properly installed each certificate.

Figure 5:
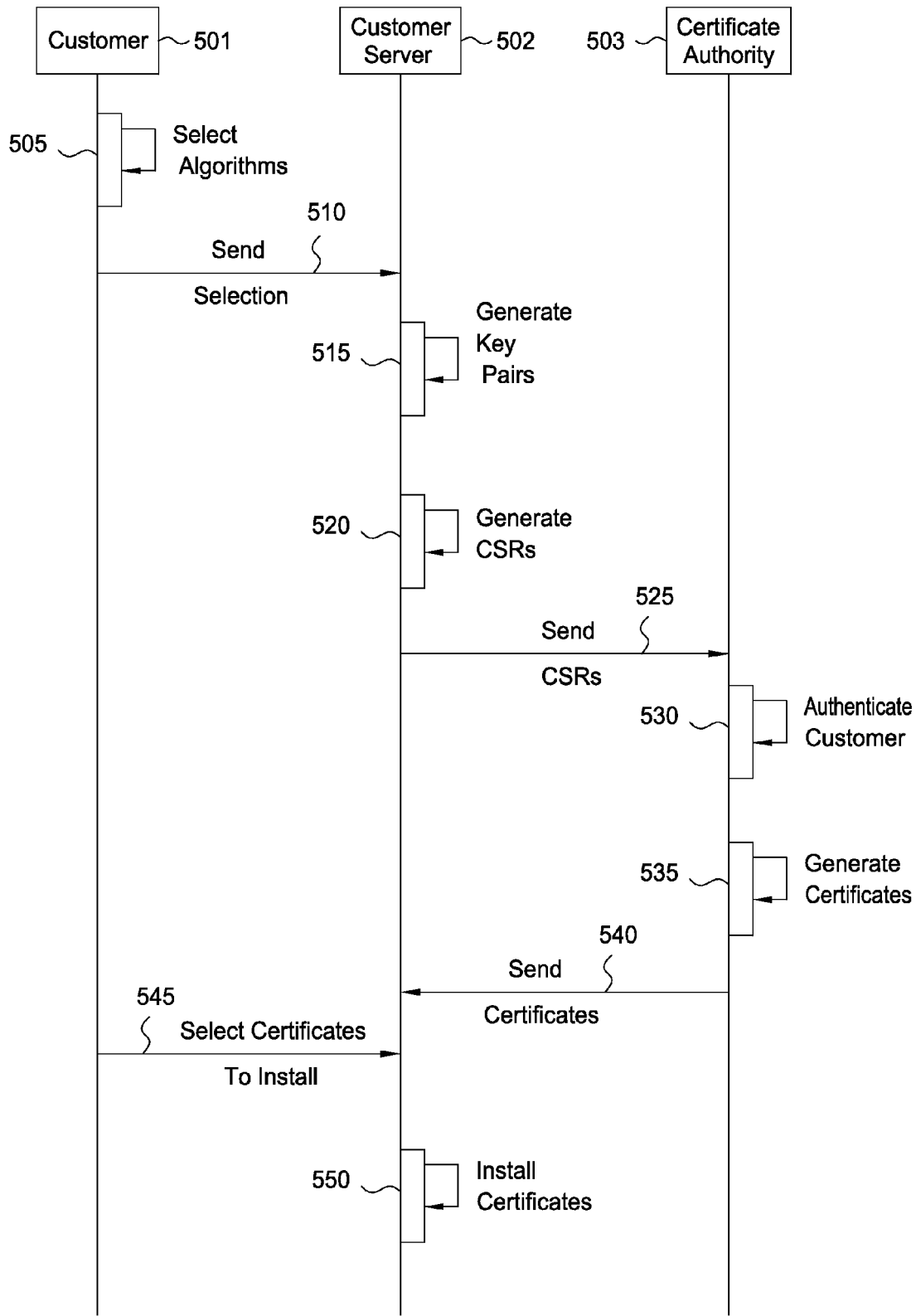
FIG. 5 illustrates a sequence diagram for generating multiple key pairs and installing certificates using various signature and thumbprint algorithms, according to one embodiment.

FIG. 5 illustrates a sequence diagram 500 for generating multiple key pairs and installing certificates using various signature and thumbprint algorithms, according to one embodiment. As shown, a customer 501 selects algorithms to use in generating keys (at 505). At 510, customer 501 sends the selection to a customer server 502. At 515, customer server 502 generates public/private key pairs using each algorithm selected by customer 401. At 520, customer server 502 generates CSRs using the public key of each key pair (as well as based on other information provided by customer 501). At 525, customer server 502 sends the generated CSRs to CA 503.

At 530, CA 503 authenticates customer server 502 and validates and processes the CSRs. Upon success, at 535, CA 503 generates certificates based on the CSRs. At 540, CA 503 sends the generated certificate files to customer server 502. Customer server 502 prompts customer 501 to select the certificates to install. At 545, customer 501 sends the selection to customer 502. At 550, customer server 502 installs the certificates.

Figure 6:
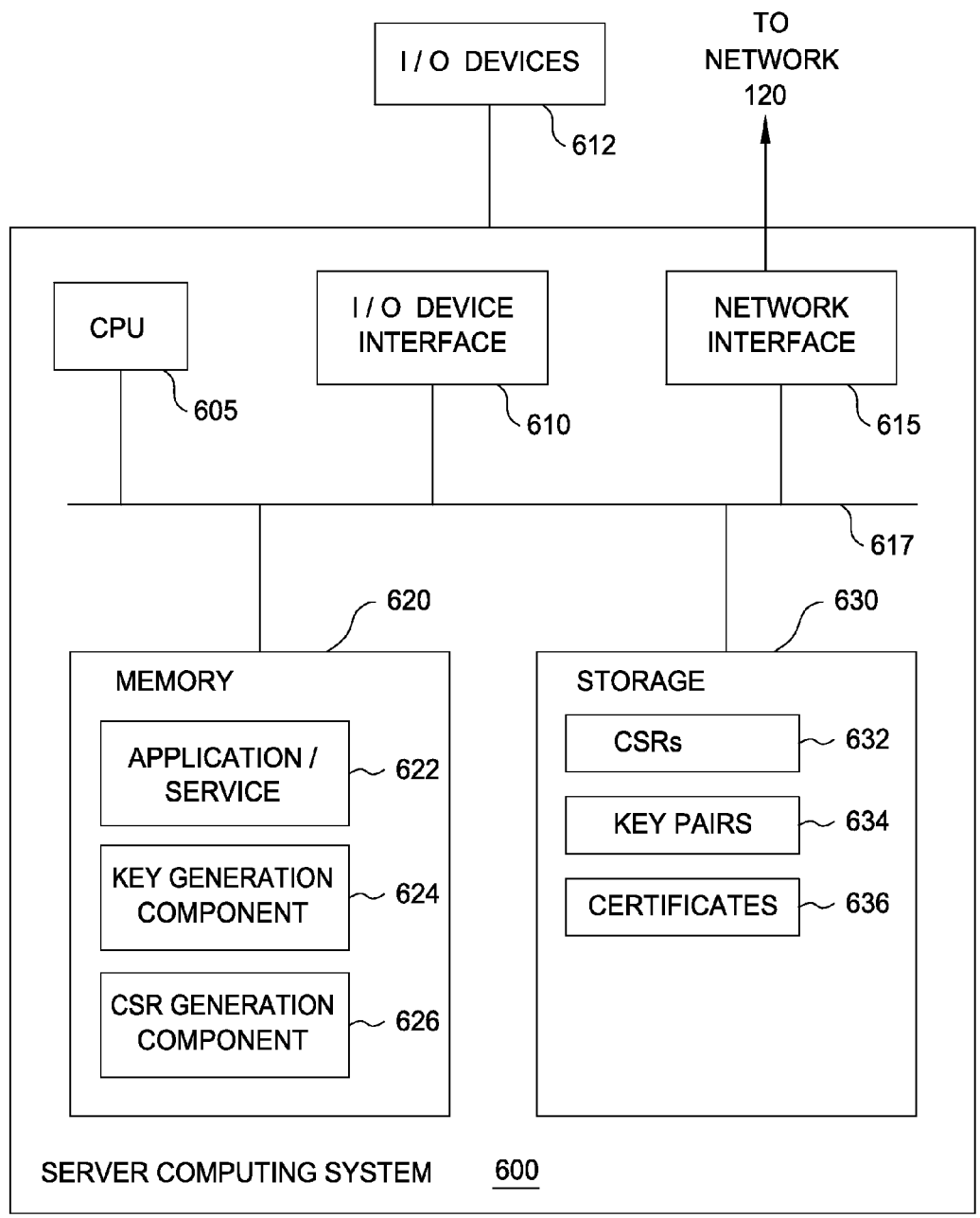
FIG. 6 illustrates an example computing system configured to generate multiple key pairs using different algorithms and similarly install certificates signed using different algorithms, according to one embodiment.

FIG. 6 illustrates an example computing system 600 configured to generate multiple key pairs using different algorithms and similarly install certificates using different algorithms, according to one embodiment. As shown, the computing system 600 includes, without limitation, a central processing unit (CPU) 605, a network interface 615, a network interface 615, a memory 620, and storage 630, each connected to a bus 617. Computing system 600 may also include an I/O device interface 610 connecting I/O devices 612 (e.g., keyboard, display and mouse devices) to computing system 600. Further, in context of this disclosure, the computing elements shown in computing system 600 may correspond to a physical computing system (e.g., a system in a data center) or may be a virtual computing instance executing within a computing cloud.

CPU 605 retrieves and executes programming instructions stored in the memory 620 as well as stores and retrieves application data residing in the storage 630. The interconnect 617 is used to transmit programming instructions and application data between CPU 605, I/O devices interface 610, storage 630, network interface 615, and memory 620. Note, CPU 605 is included to be representative of a single CPU, multiple CPUs, a single CPU having multiple processing cores, and the like. Memory 620 is generally included to be representative of a random access memory. Storage 630 may be a disk drive storage device. Although shown as a single unit, storage 630 may be a combination of fixed and/or removable storage devices, such as fixed disc drives, removable memory cards, or optical storage, network attached storage (NAS), or a storage area-network (SAN).

Illustratively, memory 620 includes an application/service 622, a key generation component 624, and a CSR generation component 626. Storage 630 includes one or more CSRs 632, key pairs 634, and certificates 636. Application/service 622 generally provides one or more software applications and/or computing resources accessed over a network 115 by users. A user may access application/service 622 to enter information relevant to generating a CSR 632. In addition to organizational and server information, such relevant information may also include signature and thumbprint algorithms (e.g., DSA, ECC, RSA, SHA-1, SHA-2, etc.). After a user sends the relevant information, key generation component 624 generates key pairs 634 using algorithms specified by the user and stores key pairs 634 in storage 630. CSR generation component 626 creates CSRs 632 using the information provided and corresponding public keys from key pairs 634. Application/service 622 may send CSRs 632 to a certificate authority and receive corresponding certificates 636 from the certificate authority.

As described, embodiments presented herein provide techniques for generating multiple key pairs using different algorithms and installing multiple certificates using different signing and hashing algorithms (e.g., RSA, DSA, ECC, SHA-1, SHA-2, etc.). A customer provides a server with a selection of various certificate signing and hashing algorithms (e.g., through an application), and the server, in turn generates key pairs and CSRs using each algorithm. When a CA receives the CSRs, the CA generates and sends corresponding certificates to the customer server. The customer selects which certificates to install, and the customer server, upon receiving the selection, installs the certificates. Advantageously, this approach reduces the amount of time and simplifies the process of installing certificates based on different algorithms on a server.

While the foregoing is directed to embodiments of the present invention, other and further embodiments of the invention may be devised without departing from the basic scope thereof, and the scope thereof is determined by the claims that follow.

What is claimed is:

1. A method for concurrently requesting multiple certificates from a certificate authority (CA), the method comprising:

receiving a selection of a plurality of algorithms to use in generating a corresponding plurality of key pairs, each key pair to be associated with one of a plurality of certificates to be generated, wherein the plurality of algorithms includes (i) at least one of signing algorithms RSA, ECDH, ECDSA, and Diffie-Hellman and (ii) at least one of hashing algorithms SHA1, SHA224, SHA226, SHA384, and SHA512 and wherein a key size is specified for each of the algorithms;

receiving information common to the plurality of certificates to be generated;

in response to receiving the selection of the plurality of algorithms, generating, from the selection, a plurality of public/private key pairs, each public/private key pair being generated for a corresponding one of the plurality of algorithms;

for each public key in the public/private key pairs, generating a certificate signing request (CSR) that includes the common information;

transmitting the CSRs to the CA;

receiving from the CA, a plurality of digital certificates, wherein each digital certificate corresponds to one of the CSRs;

receiving a selection of one or more of the plurality of digital certificates to install on a server; and automatically installing each selected digital certificate on the server, each selected digital certificate being installed according to an algorithm corresponding to the selected digital certificate, wherein, after the selected one or more digital certificates are installed, the CA retrieves and evaluates each digital certificate from the server to determine whether the digital certificate was properly installed.

2. The method of claim 1, wherein the one or more digital certificates are installed using processes corresponding to the algorithm upon which each digital certificate is generated.

3. The method of claim 1, wherein installing the at least one of the digital certificates includes installing one or more intermediate certificates for one of the digital certificates.

4. The method of claim 1, wherein the information common to the plurality of certificates to be generated includes domain and organization information.

5. A non-transitory computer-readable storage medium storing instructions, which, when executed on a processor, performs an operation for concurrently requesting multiple certificates from a certificate authority (CA), the operation comprising:

receiving a selection of a plurality of algorithms to use in generating a corresponding plurality of key pairs, each key pair to be associated with one of a plurality of certificates to be generated, wherein the plurality of algorithms includes (i) at least one of signing algorithms RSA, ECDH, ECDSA, and Diffie-Hellman and (ii) at least one of hashing algorithms SHA1, SHA224, SHA226, SHA384, and SHA512 and wherein a key size is specified for each of the algorithms;

receiving information common to the plurality of certificates to be generated;

in response to receiving the selection of the plurality of algorithms, generating, from the selection, a plurality of public/private key pairs, each public/private key pair being generated for a corresponding one of the selected plurality of algorithms;

for each public key in the public/private key pairs, generating a certificate signing request (CSR) that includes the common information;

transmitting the CSRs to the CA;

receiving from the CA, a plurality of digital certificates, wherein each digital certificate corresponds to one of the CSRs;

receiving a selection of one or more of the plurality of digital certificates to install on a server; and automatically installing each selected digital certificate on the server, each selected digital certificate being installed according to an algorithm corresponding to the selected digital certificate, wherein, after the selected one or more digital certificates are installed, the CA retrieves and evaluates each digital certificate from the server to determine whether the digital certificate was properly installed.

6. The computer-readable storage medium of claim 5, wherein the one or more digital certificates are installed using processes corresponding to the algorithm upon which each digital certificate is generated.

7. The computer-readable storage medium of claim 5, wherein installing the at least one of the digital certificates includes installing one or more intermediate digital certificates for one of the digital certificates.

8. The computer-readable storage medium of claim 5, wherein the information common to the plurality of certificates to be generated includes domain and organization information.

9. A system, comprising:

a processor and a memory hosting an application, which, when executed on the processor, performs an operation for concurrently requesting multiple certificates from a certificate authority (CA), the operation comprising:

receiving a selection of a plurality of algorithms to use in generating a corresponding plurality of key pairs, each key pair to be associated with one of a plurality of certificates to be generated, wherein the plurality of algorithms includes (i) at least one of signing algorithms RSA, ECDH, ECDSA, and Diffie-Hellman and (ii) at least one of hashing algorithms SHA1, SHA224, SHA226, SHA384, and SHA512 and wherein a key size is specified for each of the algorithms, receiving information common to the plurality of certificates to be generated, in response to receiving the selection of the plurality of algorithms, generating, from the selection, a plurality of public/private key pairs, each public/private key pair being generated for a corresponding one of the selected plurality of algorithms, for each public key in the public/private key pairs, generating a certificate signing request (CSR) that includes the common information, transmitting the CSRs to the CA, receiving from the CA, a plurality of digital certificates, wherein each digital certificate corresponds to one of the CSRs, receiving a selection of one or more of the plurality of digital certificates to install on a server, and automatically installing each selected digital certificate on the server, each selected digital certificate being installed according to an algorithm corresponding to the selected digital certificate, wherein, after the selected one or more digital certificates are installed, the CA retrieves and evaluates each digital certificate from the server to determine whether the digital certificate was properly installed.

10. The system of claim 9, wherein the one or more digital certificates are installed using processes corresponding to the algorithm upon which each digital certificate is generated.

11. The system of claim 9, wherein installing the at least one of the digital certificates includes installing one or more intermediate digital certificates for one of the digital certificates.

12. The system of claim 9, wherein the information common to the plurality of certificates to be generated includes domain and organization information.

* * * * *